United States Patent Office 2,899,752
Patented Aug. 18, 1959

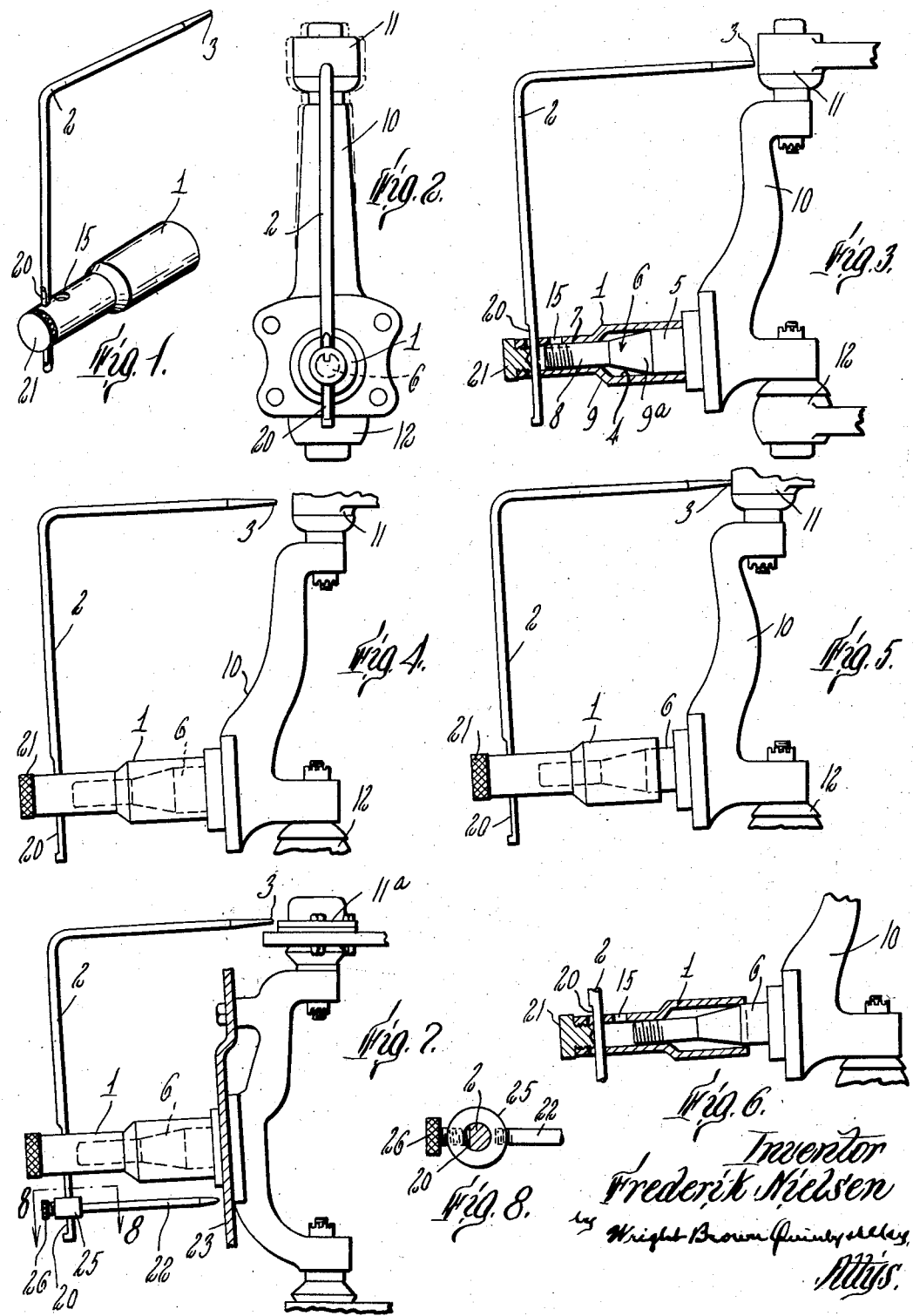

2,899,752

GAGE FOR INDICATING KING PIN INCLINATION

Frederik Nielsen, Milton, Mass.

Application March 30, 1955, Serial No. 497,979

2 Claims. (Cl. 33—203.18)

This invention relates to gages for indicating variation from correct of king pin inclination, and more particularly for use in connection with suspension of the front wheels of automobiles. It will also indicate when the wheel spindle is bent.

For a complete understanding of this invention, reference may be had to the accompanying drawings in which Figure 1 is a perspective view of a gage embodying the invention.

Figure 2 is a front elevation of the same as applied to a wheel spindle of a well known type.

Figure 3 is a view partly in side elevation and partly broken away and in section of the parts shown in Figure 2, the wheel mounting parts being in correct relative positions.

Figure 4 is a view similar to Figure 3, but showing the suspension arm bent to the right out of proper position.

Figure 5 is a view similar to Figure 4, but showing the arm bent to the left from proper position.

Figure 6 is a view similar to a portion of Figure 3, but showing a bent spindle.

Figure 7 is a view similar to Figure 3, but showing the gage applied to a wheel suspension of a different construction than that of the previous figures.

Figure 8 is a detail sectional view to a larger scale on line 8—8 of Figure 7.

As shown best in Figure 1, the gage comprises a tubular portion 1 and a gage rod 2 secured thereto at a predetermined angular relation to the axis of the tube, herein shown as at right angles thereto. This gage rod 2 has an end portion 3 in predetermined relation to the tubular portion 1. Preferably the tubular portion 1 is of two different internal diameters, the free end portion being of larger internal diameter as shown at 4, and adapted to slidably engage the inner larger diameter portion 5 of a wheel spindle 6. The outer portion of the tubular member 1 is shown as of smaller internal diameter as at 7, adapted to engage the outer smaller diameter portion 8 of the spindle. These two portions of the tubular member are substantially spaced and are joined by a part 9 more abrupt than the intermediate portion 9a of the spindle.

As shown in Figures 1 to 5, the spindle is carried by an arm 10 pivotally supported at opposite ends as at 11 and 12. The axis of turning for the arm 10 about these portions 11 and 12 should be common to the portions 11 and 12, but sometimes, through accident, this arm becomes bent out of proper position and the gage of this invention is intended to show such a condition.

When the tubular member 1 is fully engaged over the spindle as shown in Figure 3, the end portion 3 should approach closely the upper pivotal support 11 and should approach its central transverse axis as shown in Figure 2. If the arm 10 is bent laterally in either direction from its proper position, as shown by dotted lines in Figure 2, this end portion 3 will not approach the central widthwise portion thereof and this will be evident to the user of the gage. If the arm 10 is bent so that its portion 11 is inwardly from proper position, as shown in Figure 4, the end 3 will be spaced away from the portion 11 to an extent which will be evident as shown in Figure 4, and thus indicate the faulty alinement of the upper and lower suspension points. If the upper end portion is bent outwardly, it will be impossible to press the tubular portion 1 home on the spindle, since the upper portion 11 will contact with the end 3 of the rod and prevent this being done. This will therefore indicate this particular fault of the arm 10.

In certain types of suspension there is a keyway in the upper face of the spindle, and the tubular member 1 may be provided with a hole 15 through which the keyway may be observed, thus indicating, when the keyway is immediately below the hole, that the tubular member 1 is in proper angular position relative to the spindle for test purposes.

As shown, the rod 2 may be adjustable axially through the tubular member 1, thus to provide for different sizes of wheel suspension and it may be clamped in adjusted axial position and also against turning about its axis. For this purpose the rod 2 may have a flat portion 20 which may be engaged by a clamping nut 21 threaded into the outer end of the tubular member 1.

In certain types of wheel suspension, as shown in Figure 7, where the keyway is not on the top of the spindle, it is difficult to determine when the upper end 3 of the gage rod is in proper position relative to the upper support 11a, and under such conditions a second gage rod 22 may be carried by the lower end of the rod 2 beneath the tubular member 1 and extend toward a brake drum member 23 or other vehicle part which may have a mark thereon to which the end of the rod 22 may be brought, thus indicating the proper angular position of the tubular member 1 for gaging purposes.

In case the spindle is bent, as indicated in Figure 6, the tubular member 1 will not go entirely thereover and this will indicate a bent spindle as shown in Figure 6, even though the upper end 3 of the gaging rod may not be stopped by engagement with the upper suspension member.

As shown in Figure 8, the lower gage rod 22 may be carried by a collar 25 secured in position by a thumb screw 26 which engages the flat side 20 of the gage rod 2.

From the foregoing description of certain embodiments of this invention it should be evident to those skilled in the art that various further changes and modifications may be made without departing from its spirit or scope.

I claim:

1. A gage of the class described, comprising a tube having a larger internal diameter at its inner end adapted to fully engage the inner portion of a wheel spindle and an outer smaller diameter portion adapted to slidably engage the outer reduced diameter extremity of said spindle, said tube having a rod extending therethrough at right angles to the axis of said tube and having a free end turned toward the upper end portion of the spindle support arm and terminating adjacent to the center point of said arm when said arm is in proper position and said wheel spindle is straight, and an indicating rod carried by the opposite end of said first mentioned rod and terminating adjacent to another predetermined portion of the vehicle when said gage is correctly positioned on said spindle.

2. A gage of the class described, comprising a tube having a larger internal diameter at its inner end adapted to fully engage the inner portion of a wheel spindle and an outer smaller diameter portion adapted to slidably engage the outer reduced diameter extremity of said spindle, said tube having a rod extending therethrough at right angles to the axis of said tube and having a free end turned toward the upper end portion of the spindle support arm and terminating adjacent to the center point of said arm when said arm is in proper position and said wheel spindle is straight, said tube having a hole therethrough through which a predetermined portion of said spindle may be viewed when said gage is in proper gaging position on the spindle.

References Cited in the file of this patent

UNITED STATES PATENTS

| | | |
|---|---|---|
| 437,225 | McDuff et al. | Sept. 30, 1890 |
| 1,822,599 | Monk | Sept. 8, 1931 |
| 1,825,988 | Wochner | Oct. 6, 1931 |
| 2,005,870 | Miller et al. | June 25, 1935 |
| 2,119,206 | Frisz | May 31, 1938 |
| 2,553,525 | Burke et al. | May 15, 1951 |

FOREIGN PATENTS

| | | |
|---|---|---|
| 738,532 | France | Oct. 18, 1932 |